US007016052B2

(12) United States Patent
Bloch et al.

(10) Patent No.: US 7,016,052 B2
(45) Date of Patent: Mar. 21, 2006

(54) APPARATUS FOR MEASURING CHARACTERISTICS OF A HOLE AND ASSOCIATED METHOD

(75) Inventors: Daniel D. Bloch, St. Peters, MO (US); John H. Belk, St. Louis, MO (US); Theresa L. Clifton, St. Louis, MO (US); Philip L. Freeman, St. Louis, MO (US)

(73) Assignee: The Boeing Company, Seattle, WA (US)

( * ) Notice: Subject to any disclaimer, the term of this patent is extended or adjusted under 35 U.S.C. 154(b) by 308 days.

(21) Appl. No.: 09/966,987

(22) Filed: Sep. 28, 2001

(65) Prior Publication Data

US 2003/0063291 A1    Apr. 3, 2003

(51) Int. Cl.
*G01B 11/00* (2006.01)
*G01B 11/30* (2006.01)
*G01N 21/00* (2006.01)

(52) U.S. Cl. .................. 356/601; 356/626; 356/241.1; 356/241.4; 356/241.5

(58) Field of Classification Search ............. 356/241.1, 356/241.2, 241.3, 241.4, 241.5, 241.6, 601, 356/626
See application file for complete search history.

(56) References Cited

U.S. PATENT DOCUMENTS

| | | | |
|---|---|---|---|
| 3,589,815 A | | 6/1971 | Hosterman |
| 3,749,500 A | | 7/1973 | Carlson et al. |
| 3,761,186 A | * | 9/1973 | Wason ................. 356/241.1 |
| 3,817,635 A | * | 6/1974 | Kawahara ............. 356/625 |
| 4,299,491 A | | 11/1981 | Waters et al. |
| 4,461,576 A | | 7/1984 | King |
| 4,549,207 A | | 10/1985 | Boshier |
| 4,561,776 A | * | 12/1985 | Pryor ................. 356/72 |
| 4,725,883 A | | 2/1988 | Clark, Jr. et al. |
| 4,752,127 A | | 6/1988 | Zafred |
| 4,837,615 A | | 6/1989 | Boshier |
| 5,010,658 A | | 4/1991 | Griffith et al. |
| 5,045,936 A | * | 9/1991 | Lobb et al. ............ 348/67 |
| 5,317,387 A | * | 5/1994 | Van Hengel et al. .... 356/625 |
| 5,325,177 A | * | 6/1994 | Peterson .............. 356/505 |
| 5,416,590 A | | 5/1995 | Stover et al. |
| 5,434,669 A | * | 7/1995 | Tabata et al. .......... 356/477 |
| 5,646,538 A | | 7/1997 | Lide et al. |
| 5,757,496 A | | 5/1998 | Yamazaki |
| 5,856,874 A | | 1/1999 | Tachibana et al. |
| 5,895,927 A | * | 4/1999 | Brown ............... 250/559.19 |
| 6,633,378 B1 | * | 10/2003 | Doyle, Jr. ............ 356/241.1 |

OTHER PUBLICATIONS

Daniel D. Bloch, Craig F. Hanson; *Free Hand Robotic Installation of Blind Bolts; SAE Technical Paper Series—Aerospace Automated Fastening Conference and Exposition*; 1992; 922409; The Engineering Society for Advancing Mobility Land Sea Air and Space; Society of Automotive Engineers, Inc.; ISSN 0148-7191; Pennsylvania; USA.

* cited by examiner

*Primary Examiner*—Zandra V. Smith
*Assistant Examiner*—Roy M. Punnoose
(74) *Attorney, Agent, or Firm*—Alston & Bird LLP

(57) ABSTRACT

The apparatus and method of the present invention provide a quick, simple and accurate manner in which to measure the dimensions or characteristics of a hole without contacting the hole. The apparatus and method of the present invention also automatically detect different materials defining the hole and, therefore, the location of the interface where the materials meet. To measure the characteristics of the hole, the apparatus and method measure the intensities of the light reflected off the hole wall. In addition, the light directed toward the hole wall by the optical fiber may be of the type, such as collimated or focused, to provide distinct reflections that are received and measured by the optical receiver to supply accurate measurements of the hole characteristics.

19 Claims, 5 Drawing Sheets

APPARATUS FOR MEASURING CHARACTERISTICS OF A HOLE AND ASSOCIATED METHOD

FIELD OF THE INVENTION

This invention relates to tools for measuring the interior characteristics of a hole including the depth of the hole and, more particularly, to a fiber optic probe that measures the interior characteristics of a hole without contacting the inside of the hole and that detects interfaces between materials within the hole.

BACKGROUND OF THE INVENTION

Measuring the interior features of a hole is critical in many industries. For example, manufacturers generally must use a variety of materials and fasteners to assemble a product. The fasteners hold together the materials, which may have assorted properties and dimensions. Typical product assemblies involve stacks of materials that may have different stack thicknesses. When the assemblers drill holes into and/or through the stacks of materials of different thickness, the result is a variety of hole lengths. The hole length or distance from the top edge of the hole to the bottom edge is commonly called "grip length." A fastener must be carefully chosen to closely fit the hole's grip length in order to properly clamp the stack of materials together.

To determine the proper size fastener to select for connecting the materials of the assembly, one must know the grip length of the hole. The grip length of the fastener should match the grip length of the hole as closely as possible. The part of the fastener that defines the grip length may be different for different types of fasteners. In addition, the hole may be counter sunk and one must choose the proper size fastener to fit the counter sink of the hole. A counter sunk hole is formed such that the fastener fits completely within the hole and the fastener is flush with the outside of the assembly. Therefore, a counter sunk hole has a counter sink facing the outside of the assembly that is angled radially inward to receive the head of the fastener.

Selecting the correct size of fastener is essential in certain product assemblies because a fastener that is too long or too short could compromise the structural integrity and/or the safe and efficient operation of the product. In aerospace manufacturing, for example, if the product contains an incorrect size fastener, the product may fail to meet the structural requirements. If the fastener is too short or too long, it may not securely connect the materials, creating a risk that the materials will separate. Additionally, a fastener that is too long may cause excess weight and/or insufficient compression. The incorrect size fastener must be replaced, which causes the manufacturer to spend extra time and money for the assembly. Conversely, if the fastener is not replaced, the product may fail to meet the structural requirements and/or may not function as the manufacturers intended for the full life of the product.

Some assemblies contain thousands of holes with varying grip lengths for receiving fasteners. The grip length of each hole must be determined quickly, simply and accurately. Measuring the grip length of a hole may be difficult, particularly when measuring a "through hole," which does not have a bottom. The conventional grip length measurement methods of calipers and depth gages are not suitable for through holes because they require a bottom surface from which to reference.

Measuring the grip length of a through hole is particularly difficult in instances in which the backside of the hole is inaccessible. This type of hole is termed a blind hole and requires a blind grip length measurement. One conventional tool for measuring blind grip length is a blind fastener grip gage. In general, this gage consists of a handle with a thin ruler piece extending from the handle. The ruler has a hook at the distal end and a slide on the ruler. To use this gage, one fully inserts the ruler piece into the hole and draws the gage back until the hook contacts the "blind" side of the hole. The operator then moves the slide toward the outside surface of the hole until it straddles both sides of the hole, which is an attempt to position the gage as perpendicular as possible to the outside surface and, thus, produce the most accurate a grip length measurement. Once these steps are completed, the operator removes the gage from the hole and reads where the slide coincides with the numbers on the ruler.

The problem with this conventional tool to measure blind grip length is that it does not provide quick, simple and accurate grip length measurements that are necessary in assemblies with thousands of holes. The measurements made with the conventional tool are not quick or simple because of the time and effort involved in manually inserting, moving, adjusting, sliding and reading the gage. The measurements made with the conventional tool are also not always accurate because the outside surface may not be level enough to ensure the gage is perpendicular. In addition, the processes of moving the slide and reading the ruler are subject to human error. This conventional tool also does not provide for automated data collection, which increases the likelihood of a mistake in recording the measurement and location of each hole.

Another significant drawback to the conventional grip length measurement tools described above is that the tool makes contact with the hole wall to measure the hole. In assemblies containing soft materials, the contact of the tool could potentially damage the hole. Damage to the hole may cause irregularities in the fastener connection within the hole. Furthermore, in many industries, drilling the holes creates a substance in and around the hole that may get on the tool when it contacts the hole and, over time, may impede proper use of the tool and cause inaccurate measurements.

Although a few conventional tools exist that do not contact the hole while measuring the characteristics of the hole, they nevertheless fail to provide a quick, simple and accurate method to measure the characteristics of holes. For example, one conventional method described by U.S. Pat. No. 5,895,927 is an electro-optic, non-contact probe that determines the interior physical characteristics of a tubular structure by using a disc of unfocused light to illuminate a cross-section of the interior surface. An image of the reflections from the illuminated cross-sections of the interior surface is then constructed by a photodetector array and evaluated. This structure is not as quick and simple of a solution to hole measurements as desired because it requires many precision parts and a complex construction to create the disc of light and construct the resulting image, which increases the likelihood of difficulties in using the probe. The precision parts and complex construction of the conventional noncontact probes also cause repair and/or maintenance to be time consuming.

For the reasons described above, the conventional tools to measure the dimensions of through holes do not provide the quick, simple and accurate method necessary to efficiently measure the dimensions of the thousands of holes common in many assemblies. Without an effective manner in which to measure the dimensions of the holes, particularly the grip length, it is impossible to assure the appropriate fasteners will be selected for the holes. The conventional tools described above require manual alignment and other user tasks before the tools can take measurements of the hole, which subjects the measurements to human error. In addition, the tools do not generally provide an effective means for automatic data collection. Some of the conventional tools described above also must contact the hole wall, creating a potential for damage to the hole. Unfortunately, even the conventional tools that do not contact the hole wall may be impractical because of the complexity of the construction. Thus, there exists a need in the industry for a tool that provides a quick, simple and accurate method for measuring the dimensions, particularly the grip length, of a hole and that does not contact the hole wall.

In addition to the problems described above regarding measuring the dimensions of through holes, particularly the grip length, it is also difficult to drill and/or measure the interface of two-step through holes using the conventional method. A two-step through hole is a hole that has different diameters at different axial locations or depths. In one common application, the hole is drilled and reamed through a stack of materials such that a hole of one diameter is reamed through a first material layer and a hole of another diameter is drilled through a second material layer. Typically, the hole in the material on the side of the stack that faces the inside of the assembly has a smaller diameter than the hole in the material on the side of the stack that faces the outside of the assembly. Two-step holes are typically utilized when fastening layers of composite materials, which are less resilient than, for example, metallic materials. A fastener inserted in a single diameter hole exerts a large amount of pressure on the hole walls and the pressure may cause the composite material around the hole to deteriorate or weaken over time. Two-step holes and corresponding fasteners reduce the risk of damage to composite materials by varying the diameter of the holes, which distributes the pressure exerted by the fastener upon the composite layers. The conventional method of drilling two-step holes in the aircraft industry is to first drill through the stack of material layers to create a hole of the smaller diameter, then separate the layers and use a reamer to ream a hole with a larger diameter in one of the layers. Both of the layers must be cleaned before reforming the stack to ensure no fragments of the material are caught between the layers which could cause inaccurate alignment of the holes in the stack. The conventional method of drilling and reaming a two-step hole is prone to human error and time consuming because of the numerous steps involved.

Even in instances in which a hole having a constant diameter is to be drilled through a stack of dissimilar materials, it may be desirable to determine the location of the interface between different material layers. For example, depending upon the types of materials, different drill bits may be required to drill through the different material layers. For the reasons described above in conjunction with drilling two-step holes, however, it is generally difficult to determine the locations of the interface between the material layers with the desired accuracy. Unfortunately, none of the conventional methods to measure grip length described above are designed to detect the interface between the materials of a stack so as to assist in drilling through the stack. Thus, there exists a need in the industry for a tool that not only measures the dimensions of through holes, particularly the grip length, but also automatically detects a change in the material composition and, thus, the interface between the materials. A tool that accurately and automatically detects the interface between the materials would greatly decrease the amount of time involved in drilling and reaming two-step holes and increase the precision of the resulting holes.

SUMMARY OF THE INVENTION

In accordance with this invention, an improved apparatus for measuring characteristics of a hole and associated method are provided. The apparatus and method of the present invention may measure the physical characteristics of the hole, for example, length, diameter, and circumference. The apparatus and method of the present invention are also capable of distinguishing between different materials through which the hole extends and locating the interface between the materials. In addition, the apparatus and method can identify the backside of the hole by distinguishing between the material defining the hole and the air behind the hole. Thus, the apparatus and method of the present invention is advantageous because it provides quick and accurate measurements of the dimensions of the hole and certainty in distinguishing between different materials defining the hole and in identifying the backside of the hole by measuring and interpreting the intensity of the reflected light. The advantages of the apparatus and method of the present invention therefore save time and money for industries that assemble products, particularly those industries that require precise drilling and measurement of holes such that appropriately sized fasteners are selected and fit properly within the holes.

According to the apparatus and method of the present invention, the apparatus is a hole probe that includes at least one optical fiber, a light source, and an optical receiver. The optical fiber may be introduced into a hole to direct light radially toward the hole wall and receive light that is reflected off the hole wall. A single fiber may be utilized or, alternatively, separate optical fibers may be utilized, one for directing light and the other for receiving reflected light. Regardless of the optical fiber arrangement, the optical fiber may be introduced into the hole without contacting the hole wall. The light source provides light to the optical fiber that directs light radially toward the hole wall. The light reflected off the hole wall is received by the optical fiber which, in turn, provides the reflected light to an optical receiver. A position feedback device may also be included to determine the linear position of the optical fiber as it directs light onto and receives light reflected off of the hole wall.

The optical receiver of the apparatus and method of the present invention may measure the intensity of the light reflected off the hole wall, which permits a determination of the dimensions measurements of the hole. Further embodiments of the apparatus and method of the present invention may also include a means for distinguishing between different materials that may define the hole, including the interface therebetween. For example, the hole may be defined by a stack of at least two materials and the means may distinguish the different material layers and identify the interface between the material layers by measuring the intensities of the light reflected off the different materials. In addition, if the hole is a "through" hole, i.e., without a backside, the means may identify the backside of the hole by distinguishing between a material that defines the hole and air. Furthermore, the apparatus and method of the present invention may include a display for representing the measurements of the hole's dimensions and characteristics. Because the apparatus and method of this invention not only has the ability to enable measurement of the dimensions of the hole, but also the detection of different materials and the identification of the interface between the materials, it provides a simple, quick and accurate means to assure the appropriate fasteners will be selected for the holes and that two-step holes will be drilled and reamed precisely.

The apparatus and method of the present invention may include an embodiment having a collimating lens in optical communication with the distal end of the optical fiber is provided for transmitting collimated light toward the hole wall. The collimated light, unlike non-collimated light, does not spread as it approaches the hole wall such that the light reflects off a small, controlled area of the hole wall. Therefore, the measurements of the intensities of the collimated light reflected off the hole wall may be more precise than the measurements of the intensities of non-collimated light that reflects off of a relatively large area of the hole wall.

A further embodiment of the apparatus and method of the present invention provides a focal lens in optical communication with a distal end of the optical fiber for transmitting focused light toward the hole wall. The optical fiber is movable in the radial direction in order to coincide the focal point of the light with the hole wall. The optical fiber may also be rotatable to permit the distance to the hole wall to be measured at various points about the circumference, which provides the necessary measurements to determine dimensions of the hole in addition to the length, such as diameter, radius, and circumference. This embodiment of the apparatus and method of the present invention provides greater accuracy in measuring all the characteristics of the hole and is nevertheless simple and quick.

A movable mirror and an optical splitter are provided in another embodiment of the apparatus and method of the present invention. The optical splitter directs light from the light source to both the movable mirror and the optical fiber. The optical receiver then measures the intensity of the light reflected off the hole wall and the intensity of the light reflected off the mirror as the mirror is translated in order to determine the distance from a distal end of the optical fiber to the hole wall. Like the embodiment described above, the optical fiber of this embodiment is rotatable to permit the distance to the hole wall to be measured at various points about the circumference, which provides the necessary measurements to determine dimensions of the hole in addition to the length, such as diameter, radius, and circumference. This embodiment of the apparatus and method of the present invention also provides greater accuracy in measuring the characteristics of the hole and is nevertheless simple and quick.

The present invention also includes a hole probe apparatus nose assembly. The nose assembly comprises a nose piece, a spring, a housing and a retainer ring. The nose piece has a frusto conical shaped section tapering radially inward in a forward direction and an extending member disposed rearward of the frusto conical section. The spring surrounds the extending member of the nose piece. The nose assembly of the present invention also includes embodiments in which the extending member may have two sections, a first section that is disposed rearward of the frusto conical section and a second section having a smaller width than the first section and disposed rearward of the first section such that a step may be created in the extending member. In this embodiment, the spring surrounds the second section having the smaller width and abuts the step to the first section. The housing surrounds the extending member of the nose piece and the spring such that the spring may be slightly compressed. The housing also has an opening in the forwardly facing side through which the frusto conical section of the nose piece extends. The retainer ring may be attached around the opening in the forwardly facing side of the housing to prevent the nose piece and spring from being removed from the housing by partially covering the opening.

Embodiments of the nose assembly may also be capable of measuring the dimensions of the hole in which the nose piece is partially inserted. In addition, at least one optical fiber may extend through the housing, spring and nose piece to be introduced into a hole. The optical fiber then may direct light radically toward the hole wall and receive light reflected off the hole wall.

The apparatus and method of the present invention therefore provide a quick, simple and accurate manner in which to measure the dimensions of a hole without contacting the hole and to automatically detect different materials defining the hole and, thus, the interface between the materials. The apparatus and method of the present invention also supply accurate measurements of the hole characteristics by permitting the light directed radially toward the hole wall by the optical fiber to be a type that creates distinct reflections to be received and measured by the optical receiver, such as collimated or focused. Thus, the apparatus and method of the present invention save time and money for industries that assemble products, particularly those industries that require precise drilling and measurement of holes such that appropriately sized fasteners are selected and fit properly within the holes.

BRIEF DESCRIPTION OF THE DRAWINGS

Figure 1:
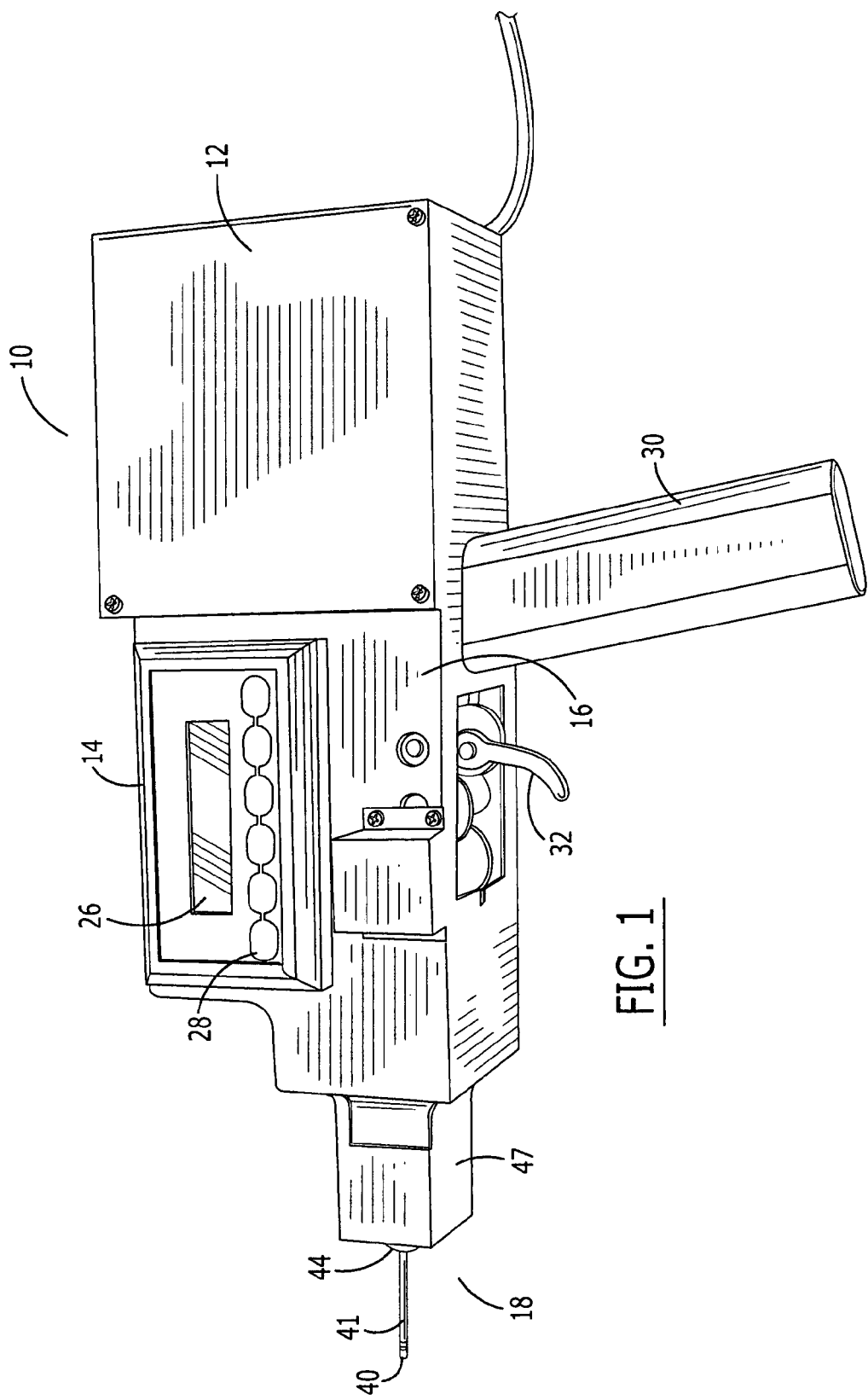
Figure 2:
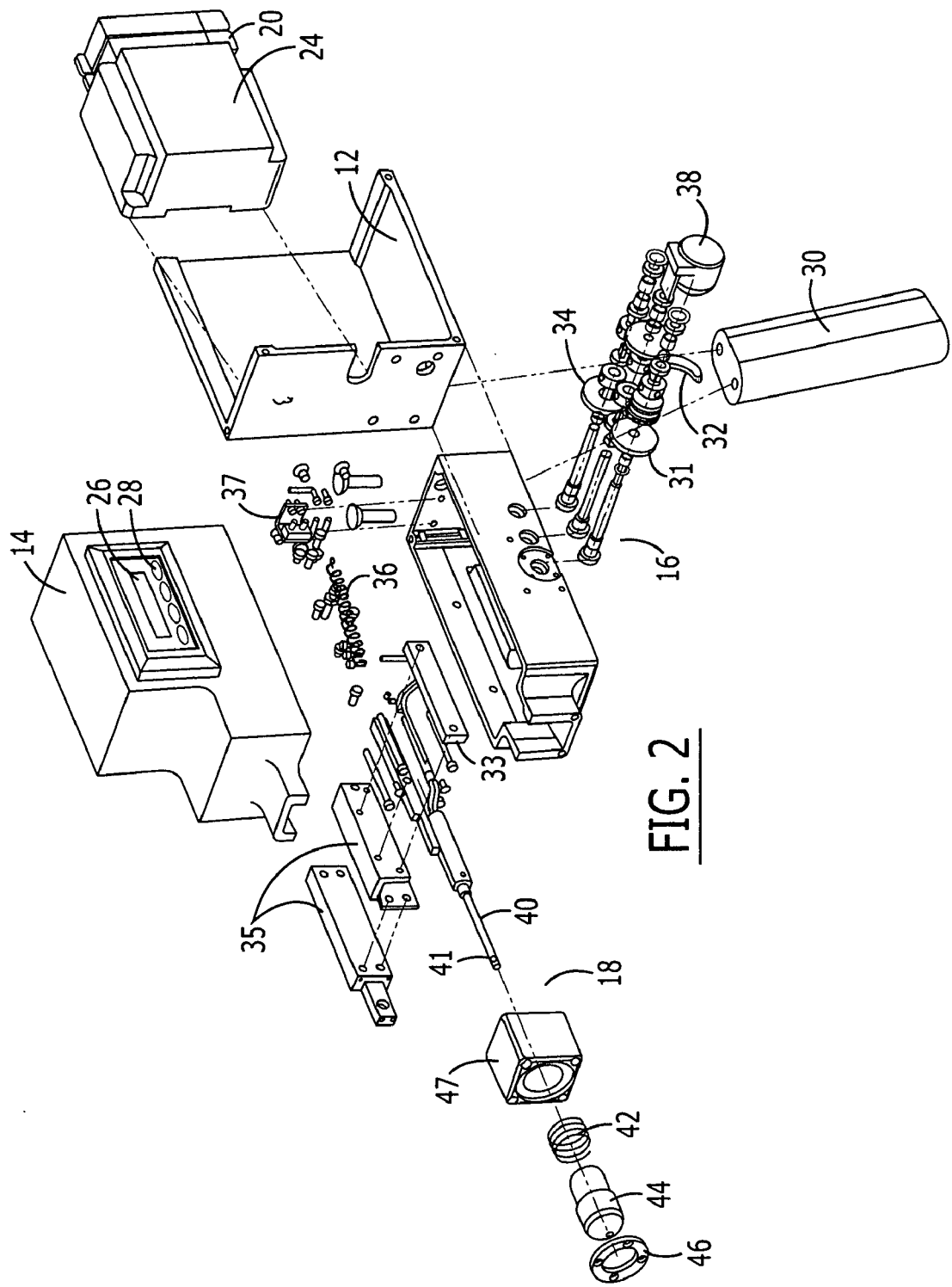
Figure 3:
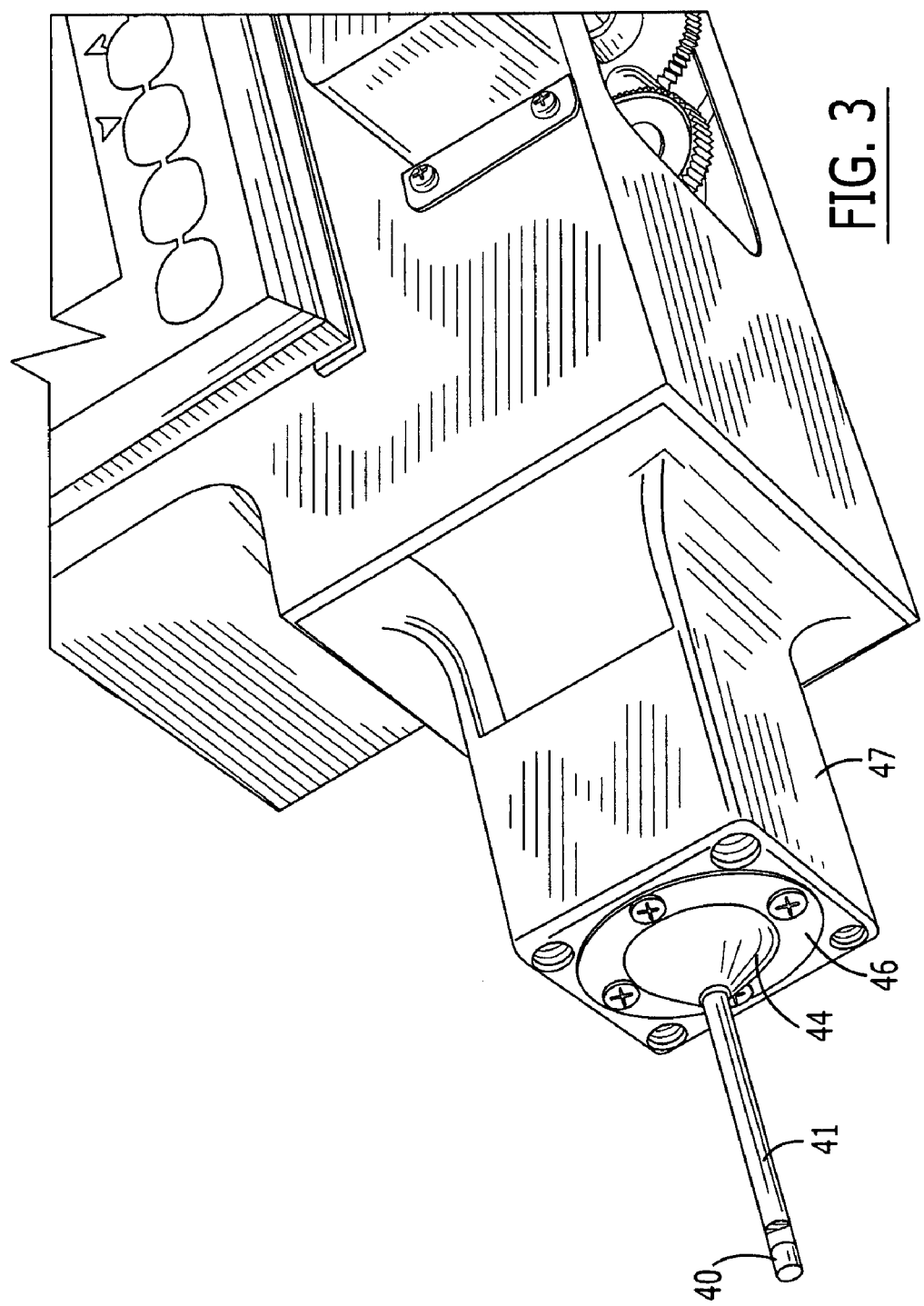
Figure 4:
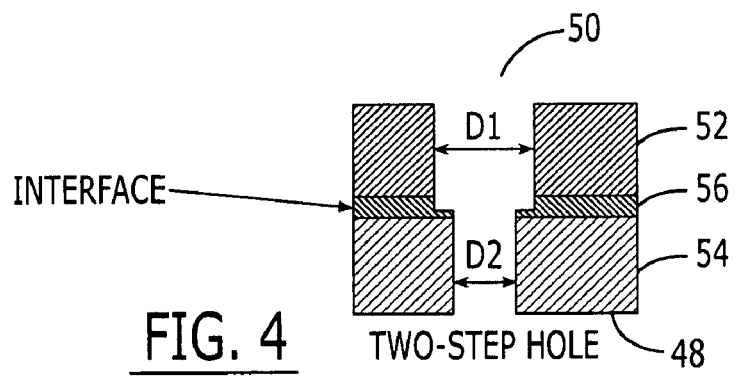
Figure 5:
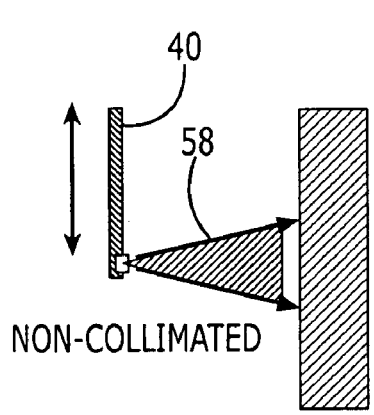
Figure 6:
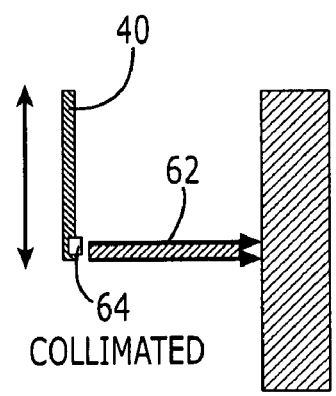
Figure 7:
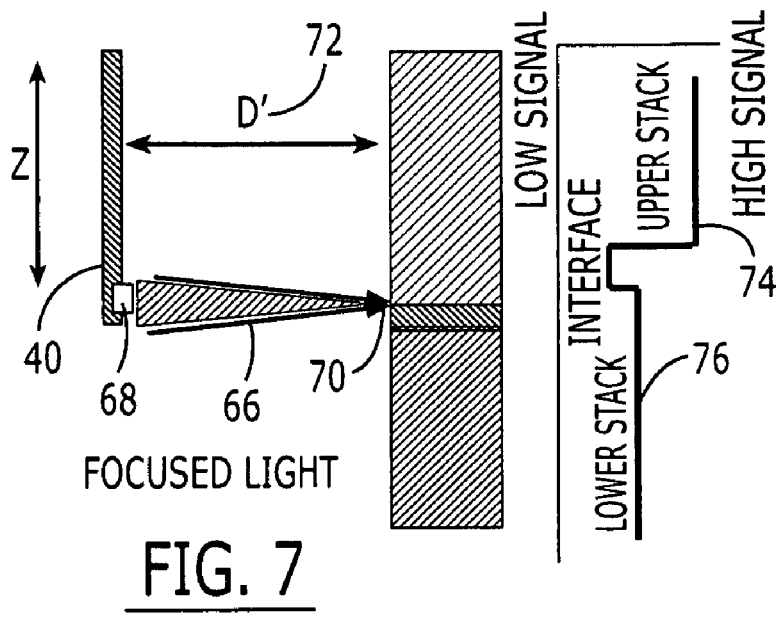
Figure 8:
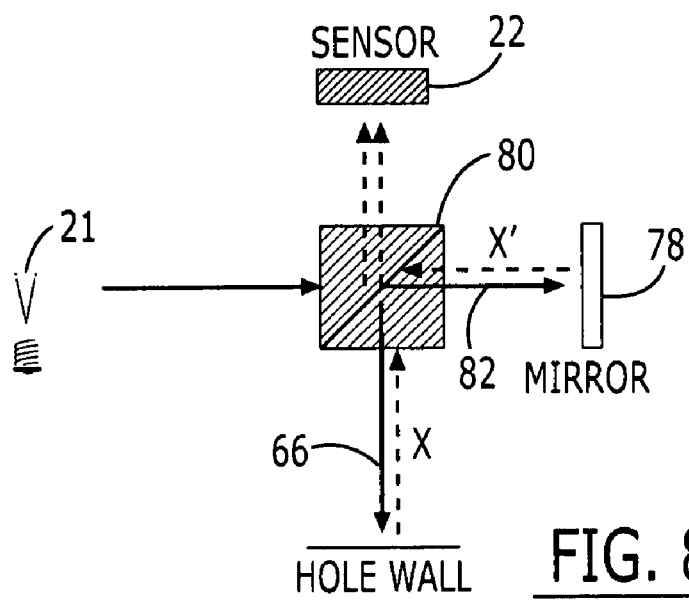

Having thus described the invention in general terms, reference will now be made to the accompanying drawings, which are not necessarily drawn to scale, and wherein:

FIG. 1 is a perspective view of the hole probe apparatus of one embodiment of the present invention;

FIG. 2 is an exploded view of the hole probe apparatus of FIG. 1;

FIG. 3 is a magnified view of the nose assembly of the hole probe of FIG. 1, depicting the extended fiber optic elements;

FIG. 4 is a representation of a typical "two-step" "through" hole defined by two materials;

FIG. 5 is a representation of non-collimated light radially directed toward a hole wall by an optical fiber, according to one embodiment of the present invention;

FIG. 6 is a representation of collimated light radially directed toward a hole wall by an optical fiber, according to one embodiment of the present invention;

FIG. 7 is a representation of focused light radially directed by an optical fiber toward a hole wall defined by two different materials, according to one embodiment of the present invention as well as a graphical depiction of the resulting intensity of the reflected light at different depths within the hole; and FIG. 8 is a representation of a hole probe apparatus that utilizes a movable mirror and optical splitter, according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The apparatus of the present invention is a hole probe 10 and one embodiment of the hole probe apparatus of the present invention is depicted in FIG. 1. The hole probe apparatus 10 may include an electro-optic portion 12, a display portion 14, a mechanical drive portion 16, and a nose assembly portion 18. The electro-optic portion 12 of the hole probe apparatus 10 typically contains a fiber optic control module 20 and a processor 24, as depicted in the exploded view of the hole probe apparatus 10 in FIG. 2 and as described in more detail below. FIG. 1 and FIG. 2 show the display portion 14 that includes a screen 26 and function buttons 28. The mechanical drive portion 16 of one embodiment contains a handle 30, an actuator, such as a trigger 32, a rack and pinion gear train 34, a linear bearing 35, a return spring 36, a home switch 37, and a position feedback device 38, as depicted in the exploded view of the hole probe apparatus 10 in FIG. 2 and as described in more detail below. The exploded view of the hole probe apparatus 10 in FIG. 2 and the magnified view of the nose assembly 18 in FIG. 3 illustrate that the nose assembly portion 18 generally contains a probe tip 40, at least one optical fiber 41, a spring 42, a nose 44, a retainer ring 46, and a housing 47.

The optical fiber 41 may be one optical fiber that both transmits and receives light or it may be separate optical fibers, one for transmitting light and one for receiving light. A proximal end of the optical fiber 41 is optically connected to the fiber optic control module 20, which contains a light source and an optical receiver. The fiber optic control module 20 may have a digital or analog interface. Examples of the fiber optic control module 20 are the D12 (digital interface) and D10 (analog interface) fiber optic control modules manufactured by Banner Engineering Corporation. The light source of the fiber optic control module 20 in the electro-optic portion 12 is disposed in optical communication with the optical fiber 41 and provides light to the optical fiber 41. The optical fiber 41 that transmits the light from the light source is inserted into a hole and directs the light radially outward from a distal end of the optical fiber 41 toward the hole wall by any available method known to those skilled in the art. Examples of methods to direct light radially outward from the distal end of the optical fiber 41 include, cleaving the distal end of the optical fiber 41 at a forty-five degree angle relative to the longitudinal axis of the optical fiber 41 to create a ninety degree internal mirror or utilizing a flexible fiber bent to ninety degrees relative to the longitudinal axis of the optical fiber 41. The optical receiver of the fiber optic control module 20 is also optically connected to the proximal end of the optical fiber 41 and receives the light reflected off the hole wall and returned by the optical fiber 41. The optical receiver measures and compares the intensities of the light reflected off the hole wall at multiple depths or locations within the hole by any available means known to those skilled in the art.

Although the hole probe apparatus 10 may analyze various types of holes, the typical type of hole that the hole probe apparatus 10 may measure is a "through" hole, which is defined by one or more materials that may have various thicknesses. Through holes are holes that do not have a bottom since they extend completely through the materials, but have a backside 48 from which the hole exits the materials. FIG. 4 is a representation of a typical "two-step" through hole 50, which is a hole defined by a stack of at least two different materials, 52 and 54, having an interface 56 that defines the boundary between the different materials.

The hole through the outer material 52 may have a larger diameter, D1, than the diameter, D2, of the hole though the inner material 54, as shown in FIG. 4. The hole probe apparatus 10 of the present invention may identify the backside 48 of the hole, distinguish the different materials 52 and 54 that define the hole, and identify the interface 56 between different materials by comparing the intensities of the light reflected off of the hole wall. In the context of this application, different materials is also defined to include materials that differ in any compositional manner, such as layers of the same material having the same composition with different fiber orientation. For example, when a stack consists of layers of the same composite material, but the layers are positioned with the respective fibers oriented in different directions, the hole probe apparatus 10 of the present invention may distinguish between the different layers by measuring the intensities of the light reflected off the different layers.

The display screen 26 and the function buttons 28 of the display portion 14 provide quick and accurate access to the dimensions and characteristics of holes as determined by the hole probe apparatus 10, which is a significant advantage over the conventional methods that do not record and/or display the exact measurements. Thus, the present invention increases efficiency for industries that require accurate hole measurements because the automatic display and recording of measurements eliminate the opportunities for human error that are present during the manual recording of measurements that is necessary in conventional methods.

Various embodiments of the present invention may be utilized in other applications that would benefit from distinguishing between different material layers of a workpiece, such as drilling programs to enable holes defined by two or more material layers to be drilled more precisely. For example, a drilling program could utilize the features of the present invention to drill and ream two-step or counter-sunk holes. In this embodiment of the present invention, both material layers may be drilled to define the hole with the smaller diameter, then a reamer may ream the larger diameter hole through the first layer without damaging the next layer because it could identify the interface 56 between the material layers and halt reaming operations before entering the next layer. In another embodiment of the present invention, the drill may be programmed to drill at different speeds or with different drill bits depending upon the type of material being drilled because the interface between the different material layers may be precisely determined in advance by the hole probe apparatus 10 of the present invention.

In accordance with one embodiment of the apparatus of the present invention, the mechanical drive portion 16 contains the handle 30, the trigger 32, the rack and pinion gear train 34, the return spring 36, and a position feedback device 38, as depicted in the exploded view of the hole probe apparatus 10 in FIG. 2. The rack and pinion gear train 34 is of a conventional construction having the rack gear 33 and the pinion 31, as shown in FIG. 2. These components supply the mechanism to controllably move the optical fiber 41 extending from the probe tip 40 into the hole. These components are designed such that when a user moves the trigger 32 or other actuator element toward the handle 30, the rack and pinion gear train 34 is engaged, which causes controlled rotation of the pinion 31 and, in turn, engages the rack gear 33. The rack gear 33 translates the rotational motion of the gear train 34 including the pinion 31 into linear motion. The rack gear 33 is mechanically coupled to the optical fiber 41 such that advancement of the rack gear 33 also extends the probe tip 40 into the hole. The rack gear 33 may be associated with linear bearings 35 to ensure the probe tip 40 translates and retracts in a linear manner. The position feedback device 38 converts the number of degrees turned by the pinion 31 of the rack and pinion gear train 34 into an electrical signal, typically expressed as pulses, that are directed to the processor 24. One example of a position feedback device is an encoder, such as the E9 encoder manufactured by API Motion. The processor 24, in turn, determines a measure of the linear advancement of the probe tip 40 into the hole based upon the signals provided by the position feedback device 38. The processor 24 also communicates with the optical receiver such that the intensity of the reflected signals may be identified with a particular depth within the hole based on the measurement of the linear advancement of the probe tip 40. An example of a processor 24 is the GE Fanuc Nano programmable logic controller. Once the probe tip 40 has been extended through the hole, the actuator, such as the trigger 32, may be released, which permits the probe tip 40 to retract into the nose 44. The return spring 36 prevents a back-lash as the rack gear 33, which is coupled to the optical fiber 41 returns to the starting position. The home switch 37 provides a reference from which to begin the probing process, such that the processor 24 determines consistent and accurate measurements based on the signals from the position feedback device 38.

The exploded view of the hole probe apparatus 10 in FIG. 2 and the magnified view of the nose assembly 18 in FIG. 3 illustrate that the nose assembly portion 18 of one embodiment of the present invention contains the probe tip 40, at least one optical fiber 41, the spring 42, the nose 44, the retainer ring 46, and the housing 47. The nose 44 has a frusto conical shaped section that tapers radially inward in a forward direction and a rearward extending member. The taper angle of the nose 44 matches the angle of the countersink of the hole to be probed. The rearward extending member may have two sections, the first section disposed rearward of the frusto conical section and the second section disposed rearward of the first section. The second section may have a smaller width than the first section such that a step is created in the extending member. The spring 42 may surround the entire extending member or may surround only the second section of the extending member by abutting the step in the extending member. The housing 47 surrounds the extending member of the nose 44 and the spring 42. The forward facing side of the housing 47 has an opening through which the frusto conical section of the nose 44 extends. The retainer ring 46 may be attached to the forward facing side of the housing 47 around the opening and partially covering the opening to prevent the nose 44 and the spring 42 from being removed from the housing 47. The spring 42 surrounding at least part of the extending member of the nose 44 is partially compressed such that the nose 44 is gently pressed against the retainer ring 46.

The frusto conical section of the nose 44 is the part of the hole probe apparatus 10 that is partially inserted into the hole. The retainer ring 46 and the housing 47 preferably make and maintain physical contact with the outer surface about the periphery of the hole so as to establish the reference location from which the depth of the hole will be measured. The frusto conical shape of the nose 44 permits the nose 44 to center itself by finding the natural equilibrium of the conical shape within the outer edge of the hole. The probe tip 40 containing at least one optical fiber 41, as described above, may then extend out of the nose 44 for movement through the hole.

In addition, embodiments of the nose assembly 18 may provide measurements of the dimensions of the hole in which the nose 44 is partially inserted by detecting the nose insertion displacement. The nose assembly 18 may measure the diameter of the outer edge of a hole and/or the counter sink of a counter sunk hole. To make the measurements, the nose 44 is partially inserted in the hole and the nose 44 centers itself as described above. The hole probe apparatus 10 then is pushed toward the hole until the retainer ring 46 and housing 47 touch the outer surface about the periphery of the hole such that the nose 44 is pushed partially into the housing 47 by compressing the spring 42. The housing 47 or other segment of the hole probe apparatus 10 may contain a linear displacement feedback device, such as an encoder or a potentiometer to detect and measure the displacement of the nose 44 relative to the housing 47. The nose displacement measurement may be used by the processor 24 to determine the counter sink and/or diameter of the hole such that a fastener with the proper diameter may be selected for the hole. The processor 24 may determine the counter sink and/or diameter of the hole from the nose displacement measurement by accessing a look up table or other algorithm.

Other embodiments of the apparatus and method of the present invention may include variations on the type of light that the optical fiber 41 directs toward the hole wall, for example non-collimated light 58, collimated light 62 or focused light 66, and the manner in which that light is directed. FIG. 5 is a representation of non-collimated light 58 directed toward a hole wall. As FIG. 5 shows, non-collimated light 58 spreads as it propagates toward the hole wall, such that the light reflected off of the hole wall and received by optical fiber 41 for each position of the probe tip 40 is representative of reflections from a fairly large area of the hole wall. While the hole probe apparatus 10 may nevertheless provide adequate measurements of the characteristics of the hole, the light reflected off of a large area of the hole wall for each position of the probe tip 40 may create varying intensities of reflected light and, thus, measurements that are less accurate than desired in some industries.

FIG. 6 is a representation of collimated light 62 directed toward a hole wall in another embodiment of the present invention. The collimating lens 64 is in optical communication with the distal end of the optical fiber 41 and the collimating lens 64 transmits collimated light 62 toward the hole wall. As FIG. 6 shows, the collimated light 62 does not spread as it transmits toward the hole wall. Thus, the light is reflected off of a relatively small area of the hole wall for each position of the probe tip 40. A hole probe apparatus 10 transmitting collimated light 62 may more accurately measure the dimensions of the hole, detect different materials or layers that define the hole, and identify the backside of the hole because of the clear quality of the light reflected off the hole wall and received by the optical receiver for each position of the probe tip 40 as it is moved though the hole.

Other embodiments of the present invention, depicted by FIGS. 7 and 8, include manners in which focused light may be directed toward a hole wall. FIG. 7 depicts an embodiment of the present invention having a focal lens 68 in optical communication with the distal end of the optical fiber 41 with the focal lens 68 transmitting focused light 66 toward the hole wall. The distance 72 from the optical fiber 41 to the focal point 70 of the light 66 is fixed by the focal length of the focal lens 68. Thus, in this embodiment, the probe tip 40 is also movable in a radial direction such that the focal point 70 of the light 66 may be positioned so as to coincide with the hole wall. To coincide the focal point 70 of the light 66 with the hole wall, the probe tip 40 is moved radially until the light reflected off the hole wall has the maximum intensity. Once the focal point 70 of the light 66 coincides with the hole wall, the probe tip 40 may be translated through the hole to determine the dimensions of the hole, distinguish the different materials or layers that define the hole, and identify interface between the materials or layers and the backside of the hole. The probe tip 40 also may be rotated and again moved radially until the focal point 70 is again coincident with the hole wall, albeit a different portion of the hole wall at the same depth. By determining the position of the probe tip 40 within the hole at each measurement, including the x, y position and the angular orientation as well on the focal length of the focal lens 68, the radius, diameter and circumference of the hole may be determined.

FIG. 7 also demonstrates an example of the different intensities of light reflected off the wall of a hole that is defined by more than one material or layer. As the probe tip 40 translates the length of the hole and receives reflected light, the optical receiver measures the intensity of the reflected light and records the intensity measurements. For example, as the probe tip 40 translates the upper layer of the stack in FIG. 7, the optical receiver measures an intensity level 74 for the light reflected off that layer. As the probe tip 40 translates the lower layer of the stack in FIG. 7, the optical receiver measures an intensity level 76 for the light reflected off that layer, which is lower than the intensity level 74 for the upper layer in this example. Therefore, the operator or the processing element may compare the intensity level 74 with the intensity level 76 and distinguish between the different materials or layer and identify the location of the interface between the materials or layers.

FIG. 8 schematically depicts another manner in which to direct focused light toward a hole wall. This embodiment of the present invention is based upon an interferometeric design and includes an optical splitter 80 that directs light from the light source 21 to both a moveable mirror 78 and the optical fiber. The light reflecting from both the hole wall and the mirror are combined by the optical splitter 80 and directed to a sensor 22, such as the optical receiver. The moveable mirror 78 is then translated until the intensity of the combined reflected light is maximized. Once the intensity of the combined light is maximized, the distance from the optical splitter 80 to the moveable mirror 78 equals the distance from the distal end of the optical fiber 40 to the hole wall. The probe tip 40 also may be rotated as described above in conjunction with FIG. 7 to determine the cross-sectional characteristics of the hole. Utilizing either of the embodiments in FIGS. 7 and 8 provides quick and accurate measurements of the dimensions of the hole, distinguishes between different materials or layers of the hole, and identifies the interface between the different materials or layers as well as the backside of the hole.

Overall, the embodiments of the apparatus and method of the present invention described above have significant advantages over the conventional methods. Unlike the conventional methods, the present invention provides simple, quick and accurate measurements of the length and/or cross-sections of through holes, as well as the ability to distinguish between different material layers that define the holes so as to assist in drilling through the stack. The present invention also minimizes the risk of human error and component complications by not requiring manual operations or precision parts to measure the characteristics of holes.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for measuring characteristics of a hole, the apparatus comprising:
   at least one optical fiber capable of being introduced into the hole, wherein said optical fiber directs light radially toward a hole wall and receives light reflected off the hole wall;
   a light source for providing light to said optical fiber;
   an optical receiver for receiving light from said optical fiber that has reflected off the hole wall and been received by said optical fiber, said optical receiver also adapted to measure the intensity of the light reflected off the hole wall so as to permit different materials to be distinguished; and
   a movable mirror and an optical splitter for directing light from said light source both to said movable mirror and said optical fiber, wherein said optical receiver measures the intensity of the light reflected off the hole wall and the intensity of the light reflected off the mirror as the mirror is translated in order to determine the distance from a distal end of said optical fiber to the hole wall.

2. The apparatus of claim 1, wherein said optical fiber is capable of being introduced into the hole without contacting the hole wall.

3. The apparatus of claim 1, wherein the hole is defined by a stack of at least two materials, and further comprising means for distinguishing between the different materials of the stack and identifying an interface therebetween based upon the intensity of the light reflected off the hole wall.

4. The apparatus of claim 1, further comprising means for distinguishing between a material that defines the hole and air so as to identify the backside of the hole.

5. The apparatus of claim 1, further comprising a collimating lens in optical communication with and proximate a distal end of said optical fiber for transmitting collimated light toward the hole wall.

6. The apparatus of claim 1, further comprising a focal lens in optical communication with and proximate a distal end of said optical fiber for transmitting focused light toward the hole wall and wherein said optical fiber is moveable in a radial direction in order to coincide the focal point of the light with the hole wall.

7. The apparatus of claim 1, wherein said optical fiber is rotatable to permit the distance to the hole wall to be measured at various points about the circumference.

8. The apparatus of claim 1, further comprising a position feedback device for determining the linear position of said optical fiber relative to the hole wall.

9. The apparatus of claim 1, further comprising a display for representing the measurements of the characteristics of the hole.

10. A method for measuring characteristics of a hole, the method comprising:
    introducing at least one optical fiber into the hole;

transmitting light along the optical fiber and directing
light from a distal end of the optical fiber toward the
hole wall;
moving the optical fiber in a radial direction toward and
away from the hole wall;
receiving light with the distal end of the optical fiber that
has reflected off the hole wall, wherein receiving light
comprises measuring the intensity of the light reflected
off the hole; and
distinguishing between different materials based upon the
intensity of the light reflected off the hole.

11. The method of claim 10, wherein introducing at least one optical fiber into the hole comprises introducing the optical fiber without contacting the hole wall.

12. The method of claim 10, wherein the hole is defined by a stack of at least two materials, and wherein distinguishing between different materials also comprises distinguishing between the different materials of the stack and of identifying an interface therebetween.

13. The method of claim 10, wherein distinguishing between different materials also comprises distinguishing between a material that defines the hole and air so as to identify the backside of the hole.

14. The method of claim 10, further comprising providing a collimating lens in optical communication with and proximate a distal end of the optical fiber for transmitting collimated light toward the hole wall.

15. The method of claim 10, further comprising providing a focal lens in optical communication and proximate with a distal end of the optical fiber for transmitting focused light along the optical fiber toward the hole wall and moving the optical fiber in a radial direction in order to coincide the focal point of the light with the hole wall.

16. The method of claim 15, further comprising rotating the optical fiber and measuring the distance to the hole wall at various points about the circumference.

17. The method of claim 10, further comprising determining the linear position of the optical fiber relative to the hole wall.

18. A method for measuring characteristics of a hole, the method comprising:
introducing at least one optical fiber into the hole;
transmitting light along the optical fiber and directing
light from a distal end of the optical fiber toward the
hole wall;
providing a movable mirror and an optical splitter for
directing light from the light source both to the movable mirror and the optical fiber;
receiving light with the distal end of the optical fiber that
has reflected off the hole wall, wherein receiving light
comprises measuring the intensity of the light reflected
off the hole, and wherein receiving light also comprises
measuring the intensity of the light reflected off the hole
wall and the intensity of the light reflected off the
mirror as the mirror is translated in order to determine
the distance from a distal end of the optical fiber to the
hole wall; and
distinguishing between different materials based upon the
intensity of the light reflected off the hole.

19. The method of claim 18, further comprising rotating the optical fiber and measuring the distance to the hole wall at various points about the circumference.

* * * * *